US012775116B2

(12) United States Patent
Peng et al.

(10) Patent No.: US 12,775,116 B2
(45) Date of Patent: Oct. 27, 2026

(54) MINERAL EXPLORATION SYSTEM AND METHOD

(71) Applicant: WSGRI Engineering & Surveying Incorporation Limited, Wuhan (CN)

(72) Inventors: Yangdong Peng, Wuhan (CN); Haifeng Li, Wuhan (CN); Zhilian Zhang, Wuhan (CN); Hao Wu, Wuhan (CN); Ke Yang, Wuhan (CN); Sen Chen, Wuhan (CN)

(73) Assignee: WSGRI Engineering & Surveying Incorporation Limited, Wuhan (CN)

( * ) Notice: Subject to any disclaimer, the term of this patent is extended or adjusted under 35 U.S.C. 154(b) by 116 days.

(21) Appl. No.: 19/011,775

(22) Filed: Jan. 7, 2025

(65) Prior Publication Data

US 2025/0237780 A1 Jul. 24, 2025

Related U.S. Application Data

(63) Continuation of application No. PCT/CN2024/088558, filed on Apr. 18, 2024.

(30) Foreign Application Priority Data

Jan. 23, 2024 (CN) ......................... 202410094903.4

(51) Int. Cl.
*G01V 3/12* (2006.01)

(52) U.S. Cl.
CPC ...................................... *G01V 3/12* (2013.01)

(58) Field of Classification Search
CPC ................................ G01V 3/12; G01S 13/885
See application file for complete search history.

(56) References Cited

U.S. PATENT DOCUMENTS

| | | | | | |
|---|---|---|---|---|---|
| 2,455,941 | A * | 12/1948 | Muskat | G01V 3/30 | 324/338 |
| 7,532,155 | B2 * | 5/2009 | Kleman | H01Q 1/225 | 342/124 |
| 11,808,910 | B2 * | 11/2023 | Alvarez | E21B 47/00 | |

FOREIGN PATENT DOCUMENTS

| | | | | |
|---|---|---|---|---|
| CN | 121069503 A * | 12/2025 | G01V 3/38 |
| WO | WO-2022120903 A1 * | 6/2022 | H01Q 1/50 |

* cited by examiner

*Primary Examiner* — Christopher E Mahoney
(74) *Attorney, Agent, or Firm* — Hemisphere Law, PLLC

(57) ABSTRACT

Disclosed is a mineral exploration system and method within the field of mineral exploration technology. The system comprises a microwave emission module, a Rydberg Atom Antenna, and a signal extraction module, with both the microwave emission module and the signal extraction module being connected to the Rydberg Atom Antenna; the microwave emission module is used to emit probing microwaves into the subsurface, where these microwaves interact with underground structures to generate reflected microwaves; the Rydberg Atom Antenna is employed to receive the reflected microwaves and generate reflected signals based on them; the signal extraction module is tasked with extracting fingerprint signals of the underground structures from the reflected signals. By combining the non-invasive nature of microwave technology with the high sensitivity of Rydberg Atom Antenna technology, this disclosure achieves more in-depth and accurate information extraction of underground structures, effectively enhancing exploration efficiency.

7 Claims, 1 Drawing Sheet

MINERAL EXPLORATION SYSTEM AND METHOD

FIELD OF THE DISCLOSURE

The disclosure relates to the technical field of mineral exploration, in particular to a mineral exploration system and method.

BACKGROUND

Mineral exploration refers to the geological work conducted on mineral deposits that have been identified as having industrial value through general and detailed surveys, using effective exploration techniques and methods. This work aims to provide reliable ore reserves and necessary geological, technical, and economic information for mine design. It is also known as deposit exploration. Deposit exploration is mainly to provide basic data and basis for mine construction design to determine the scale of mine construction, product plan, mining method, development plan, selection of mining method, ore dressing (smelting) or processing technology method, as well as the overall layout of mine construction, long-term planning and economic and social benefits of future mining enterprises.

In the existing technology, traditional mineral exploration methods mainly include well logging, electrical methods, and gravitational and magnetic methods. However, these methods have the issue of low exploration efficiency.

SUMMARY

In view of this, it is necessary to provide a mineral exploration system and method to address the problem of low exploration efficiency existing in the current technology.

To address the aforementioned issues, this disclosure provides a mineral exploration system, comprising a microwave emission module, a Rydberg Atom Antenna, and a signal extraction module, wherein both the microwave emission module and the signal extraction module are connected to the Rydberg Atom Antenna;

- the microwave emission module is used to emit probing microwaves into the subsurface, where the probing microwaves interact with underground structures to generate reflected microwaves;
- the Rydberg Atom Antenna is used to receive the reflected microwaves and generate a reflected signal based on the reflected microwaves;
- the signal extraction module is used to extract fingerprint signals of the underground structure from the reflected signals.

In some embodiments, the frequency range of the probing microwaves is from 300 MHz to 40 GHz.

In some embodiments, the signal extraction module is used to perform full-spectrum analysis on the reflected signals to extract fingerprint signals of the underground structures.

In some embodiments, the system also comprises a signal processing module, with both the Rydberg Atom Antenna and the signal extraction module connected to the signal processing module;

- the signal processing module is used to amplify and filter the reflected signals to obtain processed signals;
- the signal extraction module is used to extract fingerprint signals of the underground structure from the processed signals.

In some embodiments, the system also comprises a detection feedback module connected to the microwave emission module;

- the detection feedback module is used to acquire first parameter data of the reflected microwaves in real-time and generate a first control signal based on the first parameter data;
- the microwave emission module is used to respond to the first control signal by adjusting second parameters of the probing microwaves.

In some embodiments, the first parameter includes frequency and/or intensity.

In some embodiments, the second parameter includes at least one of direction, frequency, and power.

In some embodiments, the detection feedback module is also connected to the signal processing module;

- the detection feedback module is also used to acquire sensing status data from the Rydberg Atom Antenna and generate a second control signal based on the first parameter data and the sensing status data;
- the signal processing module is also used to respond to the second control signal by adjusting the third parameter of the signal processing module.

In some embodiments, the system also comprises a database module connected to the signal extraction module;

- the database module stores various mineral information;
- the signal extraction module is also used to compare the fingerprint signal with the mineral information to obtain the accuracy of the fingerprint signal.

This disclosure also provides a mineral exploration method, comprising:

- emitting probing microwaves into the underground, where the probing microwaves interact with underground structures to generate reflected microwaves;
- receiving the reflected microwaves based on the Rydberg Atom Antenna and generating a reflected signal based on the reflected microwaves;
- extracting fingerprint signals of the underground structures from the reflected signal.

Compared with existing technologies, the beneficial effects of this disclosure are: the microwave emission module is used to transmit probing microwaves into the subsurface. These probing microwaves interact with the underground structures, generating reflected microwaves. The Rydberg Atom Antenna receives the reflected microwaves and generates reflected signals based on the reflected microwaves. The signal extraction module is employed to extract fingerprint signals of the underground structures from the reflected signals, enabling mineral exploration. By combining the non-invasive nature of microwave technology with the high sensitivity of Rydberg Atom Antenna technology, more in-depth and accurate information extraction of underground structures is achieved, effectively enhancing exploration efficiency.

DETAILED DESCRIPTION OF PREFERRED EMBODIMENTS

Figure 1:
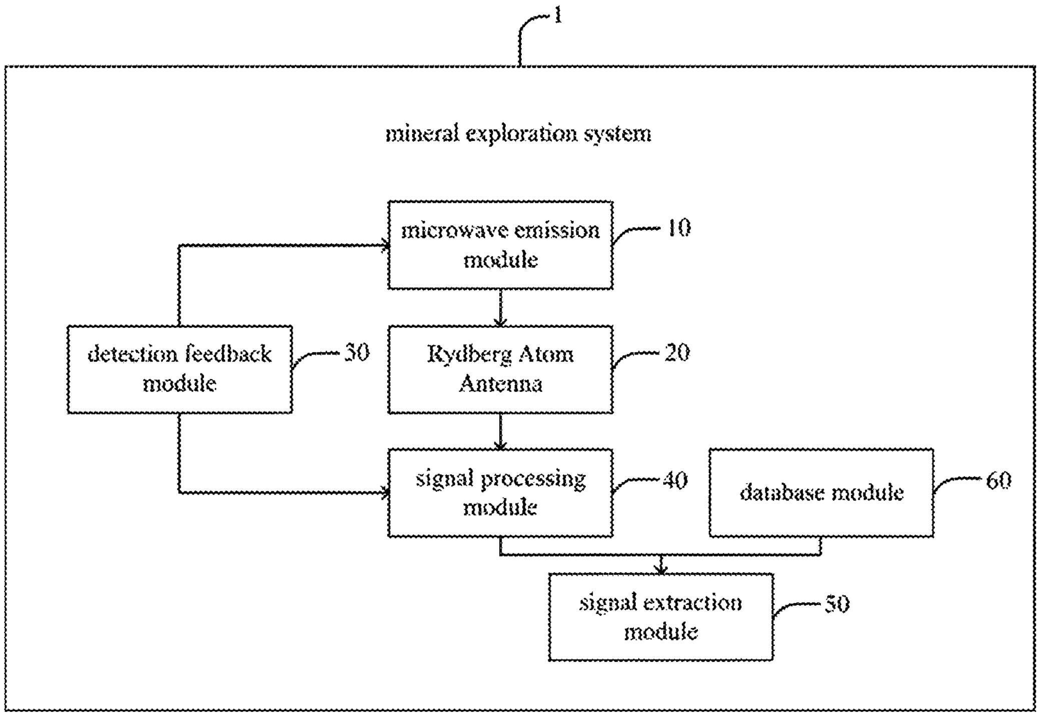
FIG. 1 is a schematic diagram of an embodiment of the mineral exploration system provided in this disclosure.

Below is a clear and complete description of the technical solutions in the embodiments of this disclosure, in conjunction with the accompanying drawings provided in the embodiments of this disclosure. It is evident that the described embodiments are merely a portion of the embodiments of this disclosure, and not exhaustive. All other embodiments obtained by those skilled in the art without creative effort, based on the embodiments in this disclosure, fall within the scope of protection of this disclosure.

It should be understood that the illustrative drawings are not drawn to scale. The flowcharts used in this disclosure depict operations implemented according to some embodiments of this disclosure. It should be appreciated that the operations in the flowcharts may not necessarily be performed in sequence, and steps without logical contextual relationships may be reversed in order or performed simultaneously. Furthermore, those skilled in the art, guided by the content of this disclosure, may add one or more additional operations to the flowchart or remove one or more operations from it. Some of the block diagrams shown in the drawings are functional entities that do not necessarily correspond to physically or logically separate entities. These functional entities can be implemented in software form, or within one or more hardware modules or integrated circuits, or across different network and/or processor systems and/or microcontroller systems.

The descriptions involving "first," "second," and so on in the embodiments of this disclosure are solely used for the purpose of implicit description and should not be understood as indicating or implying their relative importance or implicitly specifying the number of technical features being referred to. Therefore, technical features qualified by "first," "second," and so on can explicitly or implicitly include at least one of those features. The term "and/or" describes the associative relationship between associated objects, indicating that there can be three possible relationships, for example: A and/or B, which can represent the three cases of A existing alone, both A and B existing simultaneously, and B existing alone.

When "embodiment" is mentioned in this text, it implies that the specific features, structures, or characteristics described in conjunction with the embodiment can be included in at least one embodiment of this disclosure. The appearance of this phrase at various locations in the specification does not necessarily refer to the same embodiment, nor does it imply that it is an independent or alternative embodiment that is mutually exclusive with other embodiments. Those skilled in the art explicitly and implicitly understand that the embodiments described herein can be combined with other embodiments.

This disclosure provides a mineral exploration system, which will be described in detail below.

FIG. 1 is a schematic diagram of the structure of one embodiment of the mineral exploration system provided in this disclosure. The direction of the arrows in FIG. 1 represents the direction of electrical signal transmission. As shown in FIG. 1, the mineral exploration system 1 comprises a microwave emission module 10, a Rydberg Atom Antenna 20, and a signal extraction module 30. Both the microwave emission module 10 and the signal extraction module 30 are connected to the Rydberg Atom Antenna 20.

The microwave emission module 10 is used to emit probing microwaves into the subsurface, where the probing microwaves interact with the underground structures to generate reflected microwaves.

It should be noted that microwaves possess strong penetrating power, capable of penetrating through the earth's surface and interacting with underground minerals and soil. This leads to complex interactions (resulting from characteristics such as absorption, scattering, and reflection of microwaves by underground structures). Different types of minerals and soils exhibit specific responses under microwave action, generating unique reflected microwave response spectra. The frequencies of the reflected microwaves typically appear lower than those of the probing microwaves. This frequency change can reflect different characteristics of the underground structures, providing abundant information for subsequent exploration and enabling comprehensive perception of the underground structures. Additionally, microwave technology, as a non-intrusive detection method, reduces the impact on the earth's surface, offering the possibility of environmentally friendly exploration.

The Rydberg Atom Antenna 20 is used to receive the reflected microwaves and generate a reflected signal based on the reflected microwaves.

It should be noted that due to the complexity of underground structures, the frequency of microwave signals may undergo multiple changes. Additionally, microwave signals may experience various interferences and attenuations during their propagation underground, leading to signal weakening. This poses a challenge in capturing microwave signals. However, this disclosure introduces the Rydberg Atom Antenna 20, a high-energy atomic structure with strong sensitivity to microwaves, which can absorb and sense microwaves within a certain frequency range in the reflected microwaves. This effectively enhances the sensitivity and capture efficiency of exploration signals.

The signal extraction module 30 is used to extract fingerprint signals of the underground structure from the reflected signals.

It should be noted that fingerprint signals are signals with specific frequencies and intensities. Fingerprint signals have unique identifiers in underground structures and represent the specific composition and properties of different types of minerals. Through in-depth analysis of fingerprint signals, explorers can accurately identify key information about the mineral types, composition, distribution, and abundance of underground structures, providing important references for subsequent exploration.

Compared to the existing technology, this disclosure employs the microwave emission module 10 to transmit probing microwaves into the subsurface. These probing microwaves interact with the underground structures, generating reflected microwaves. The Rydberg Atom Antenna 20 is utilized to receive the reflected microwaves and generate reflected signals based on them. The signal extraction module 30 is then employed to extract fingerprint signals of the underground structures from the reflected signals, enabling mineral exploration. By combining the non-invasive nature of microwave technology with the high sensitivity of Rydberg Atom Antenna 20 technology, this method achieves more in-depth and accurate information extraction of underground structures, effectively enhancing exploration efficiency.

In some embodiments, the frequency range of the probing microwaves is from 300 MHz to 40 GHz.

It should be noted that the frequency range of the probing microwaves, from 300 MHz to 40 GHz, covers a variety of minerals. This allows the microwave emission module 10 to provide stable radiation performance across a wide range of frequencies, accommodating the frequency characteristics of different types of minerals in the underground structures and meeting the detection requirements for various frequencies.

In some embodiments, the signal extraction module 30 is used to perform full-spectrum analysis on the reflected signals to extract fingerprint signals of the underground structures.

It should be noted that through spectrum analysis algorithms, efficient and rapid analysis of full-spectrum signals can be conducted, encompassing multidimensional information such as frequency and amplitude. This allows for the capture of weak but significant signal components, not limited to specific frequency ranges. Subsequently, feature extraction algorithms are employed to accurately extract the fingerprint signals of the underground structures from the full-spectrum signals.

In some embodiments, the fingerprint signals include chemical composition fingerprints, structural characteristic fingerprints, moisture content fingerprints, ore mineralization degree fingerprints, as well as combined frequency and intensity fingerprints.

It should be noted that chemical composition fingerprints provide information about the chemical constituents within the underground structures, such as metals, minerals, and compounds. Structural characteristic fingerprints include structural features like density, porosity, and tectonic characteristics of the underground structures, as well as information on the composition and arrangement of stratigraphic layers. Moisture content fingerprints provide information on the water content within the underground structures, aiding in the identification of aquifers or water-bearing minerals. Ore mineralization degree fingerprints consist of specific signals related to the degree of mineralization, serving as fingerprints for ore types. Combined frequency and intensity fingerprints represent the specific combinations of microwave frequencies and intensities exhibited by different types of minerals.

To avoid potential data distortion introduced during signal transmission and processing, in some embodiments, referring to FIG. 1, the system also comprises a signal processing module 40, with both the Rydberg Atom Antenna 20 and the signal extraction module 30 connected to the signal processing module 40.

The signal processing module 40 is used to amplify and filter the reflected signals to obtain processed signals.

The signal extraction module 30 is used to extract fingerprint signals of the underground structure from the processed signals.

It should be noted that the signal processing module 40 precisely amplifies the reflected signals to enhance weak signals, allowing the weak signals to be presented more clearly in subsequent analysis. Following this, a band-pass filter is employed to finely filter the amplified signals, removing irrelevant signals and noise, and ensuring that only valid information related to the underground structure is retained for subsequent analysis.

To adapt to the variations in complex underground environments and ensure that the probing microwaves effectively penetrate the surface and possess sufficient energy to reach beneath, in some embodiments, referring to FIG. 1, the system also comprises a detection feedback module 50 connected to the microwave emission module 10.

The detection feedback module 50 is used to acquire first parameter data of the reflected microwaves in real-time and generate a first control signal based on the first parameter data.

The microwave emission module 10 is used to respond to the first control signal by adjusting second parameters of the probing microwaves.

Furthermore, in some embodiments, the first parameter includes frequency and/or intensity.

It should be noted that variations in the frequency and intensity of reflected microwaves can reflect the characteristics of different types of underground soils and minerals. These variations serve as indicators of the interaction between underground structures and the probing microwaves. In this embodiment, the detection feedback module 50 also acquires second parameter data of the probing microwaves. The detection feedback module 50 obtains the first parameter data and the second parameter data through a sensor network, and generates a first control signal based on both the first parameter data and the second parameter data. The sensor network comprises sensors deployed underground and sensors on the microwave emission module 10. The underground sensors are responsible for monitoring the frequency and intensity of reflected microwaves, recording the real-time interaction responses between microwaves and underground structures, and providing real-time data streams.

Furthermore, in some embodiments, the second parameter includes at least one of direction, frequency, and power.

It should be noted that by adjusting the frequency and power of the probing microwaves, it is ensured that the microwaves effectively penetrate the surface and possess sufficient energy to reach beneath the ground. Adjusting the direction of the probing microwaves allows for more precise penetration of the surface, enhancing the microwaves' penetration depth. Here, the microwave emission module 10 adjusts the direction of the probing microwaves based on phased array antenna technology, which achieves precise beam steering by controlling phase differences, enabling the microwaves to penetrate the surface in a more targeted direction.

To ensure effective capture of target microwave signals in complex underground environments, in some embodiments, the system monitors changes in its operating state in real-time and dynamically adjusts parameters for signal amplification and signal filtering. Specifically, referring to FIG. 1, the detection feedback module 50 is also connected to the signal processing module 40.

The detection feedback module 50 is also used to acquire sensing status data from the Rydberg Atom Antenna 20 and generate a second control signal based on the first parameter data and the sensing status data.

The signal processing module 40 is also used to respond to the second control signal by adjusting the third parameter of the signal processing module 40.

Furthermore, in some embodiments, the third parameter includes amplification factor.

It should be noted that dynamically adjusting the signal amplification factor based on the actual system status can adapt to variations in microwave signal intensity under different depths and geological conditions. In this embodiment, the third parameter also encompasses the characteristic parameters of the band-pass filter. The band-pass filter only allows signals within a specific frequency range to pass through, thereby removing noise and interference signals of non-target frequencies. By adjusting the filter's characteristics based on real-time monitoring of underground structural responses, the system's adaptability is enhanced.

To improve the accuracy of fingerprint signal identification, in some embodiments, as shown in FIG. 1, the system also comprises a database module 60 connected to the signal extraction module 30.

The database module 60 stores various mineral information.

The signal extraction module 30 is also used to compare the fingerprint signal with the mineral information to obtain the accuracy of the fingerprint signal.

It should be noted that the mineral information includes parameters such as frequency and intensity. By comparing the frequency and intensity of the fingerprint signal with the mineral information in the database, the types and distribution of underground minerals can be identified. Additionally, data correlation analysis techniques are introduced to correlate signals of different frequencies and intensities, enhancing the comprehensiveness and accuracy of the mineral information.

Furthermore, this disclosure also establishes high-speed data transmission channels to ensure that the vast amount of real-time collected data can be rapidly transmitted to the data processing center, utilizing optical fiber networks or other high-speed communication technologies. Additionally, a high-capacity data storage system is designed to store the real-time collected data, employing efficient data compression algorithms to minimize the occupation of storage space.

Figure 2:
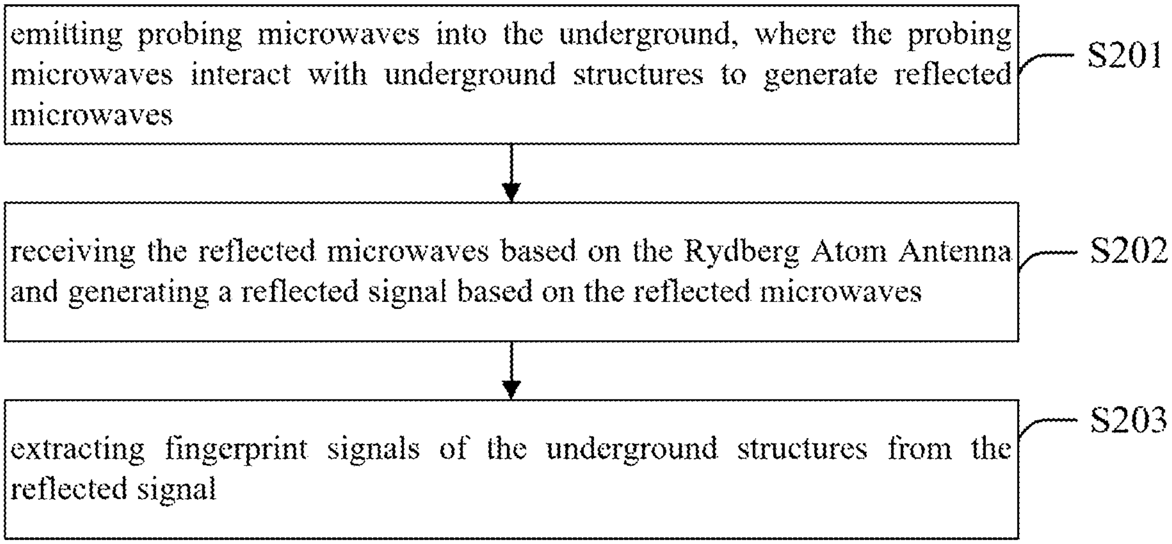
FIG. 2 is a flowchart diagram of an embodiment of the mineral exploration method provided in this disclosure.

In order to better implement the mineral exploration system 1 as described in the embodiment of this disclosure, correspondingly, based on a mineral exploration system 1, as shown in FIG. 2, this disclosure's embodiment also provides a mineral exploration method, which comprises:

S201, emitting probing microwaves into the underground, where the probing microwaves interact with underground structures to generate reflected microwaves.

S202, receiving the reflected microwaves based on the Rydberg Atom Antenna and generating a reflected signal based on the reflected microwaves.

S203, extracting fingerprint signals of the underground structures from the reflected signal.

The mineral exploration method provided in the aforementioned embodiment can realize the technical solution described in the embodiment of the mineral exploration system 1. For the specific principles of the implementation of each unit mentioned above, please refer to the corresponding content in the embodiment of the mineral exploration system 1, which will not be repeated here.

The above provides a detailed introduction to the mineral exploration system 1 provided by this disclosure. Specific examples are used in this document to elaborate on the principles and implementation methods of this disclosure. The descriptions of the above embodiments are solely intended to assist in understanding the methods and core ideas of this disclosure. Meanwhile, for those skilled in the art, based on the ideas of this disclosure, modifications may be made in terms of specific implementation methods and application scopes. In summary, the content of this specification should not be interpreted as limiting this disclosure.

The above descriptions are merely preferred embodiments of this disclosure, but the protection scope of this disclosure is not limited to them. Any variations or substitutions that can be easily conceived by those skilled in the art within the technical scope disclosed by this disclosure should be encompassed within the protection scope of this disclosure.

What is claimed is:

1. A mineral exploration system, comprising a microwave emission module, a Rydberg Atom Antenna, and a signal extraction module, wherein both the microwave emission module and the signal extraction module are connected to the Rydberg Atom Antenna;

the microwave emission module is used to emit probing microwaves into the subsurface, where the probing microwaves interact with underground structures to generate reflected microwaves;

the Rydberg Atom Antenna is used to receive the reflected microwaves and generate a reflected signal based on the reflected microwaves;

the signal extraction module is used to extract fingerprint signals of the underground structure from the reflected signals;

wherein the system also comprises a signal processing module, with both the Rydberg Atom Antenna and the signal extraction module connected to the signal processing module;

the signal processing module is used to amplify and filter the reflected signals to obtain processed signals;

the signal extraction module is used to extract fingerprint signals of the underground structure from the processed signals;

wherein the system also comprises a detection feedback module connected to the microwave emission module;

the detection feedback module is used to acquire first parameter data of the reflected microwaves in real-time and generate a first control signal based on the first parameter data;

the microwave emission module is used to respond to the first control signal by adjusting second parameters of the probing microwaves.

2. The mineral exploration system according to claim 1, wherein the frequency range of the probing microwaves is from 300 MHz to 40 GHz.

3. The mineral exploration system according to claim 1, wherein the signal extraction module is used to perform full-spectrum analysis on the reflected signals to extract fingerprint signals of the underground structures.

4. The mineral exploration system according to claim 1, wherein the first parameter includes frequency and/or intensity.

5. The mineral exploration system according to claim 1, wherein the second parameter includes at least one of direction, frequency, and power.

6. The mineral exploration system according to claim 1, wherein the detection feedback module is also connected to the signal processing module;

the detection feedback module is also used to acquire sensing status data from the Rydberg Atom Antenna and generate a second control signal based on the first parameter data and the sensing status data;

the signal processing module is also used to respond to the second control signal by adjusting the third parameter of the signal processing module.

7. The mineral exploration system according to claim 1, wherein the system also comprises a database module connected to the signal extraction module;

the database module stores various mineral information;

the signal extraction module is also used to compare the fingerprint signal with the mineral information to obtain the accuracy of the fingerprint signal.

* * * * *